US008624772B2

(12) United States Patent
Jeck et al.

(10) Patent No.: US 8,624,772 B2
(45) Date of Patent: Jan. 7, 2014

(54) METHOD AND DEVICE FOR DETECTING HIDDEN OBJECTS BY MEANS OF ELECTROMAGNETIC MILLIMETER WAVES

(75) Inventors: Michael Jeck, Mainz (DE); Claudius Volz, Seeheim-Jugenheim (DE)

(73) Assignee: Smiths Heimann GmbH, Wiesbaden (DE)

( * ) Notice: Subject to any disclaimer, the term of this patent is extended or adjusted under 35 U.S.C. 154(b) by 0 days.

(21) Appl. No.: 13/329,873

(22) Filed: Dec. 19, 2011

(65) Prior Publication Data

US 2012/0146832 A1 Jun. 14, 2012

Related U.S. Application Data

(63) Continuation of application No. PCT/EP2010/003677, filed on Jun. 18, 2010.

(30) Foreign Application Priority Data

Jun. 19, 2009 (DE) .......................... 10 2009 029 913

(51) Int. Cl.
*G01S 13/00* (2006.01)
(52) U.S. Cl.
USPC ........................................................ 342/22
(58) Field of Classification Search
USPC ........................................................ 342/22
See application file for complete search history.

(56) References Cited

U.S. PATENT DOCUMENTS

| 7,583,221 B2 | 9/2009 | Detlefsen et al. |
| 7,609,196 B2 | 10/2009 | Jeck et al. |
| 7,907,081 B2 * | 3/2011 | Noyman .......................... 342/22 |
| 2008/0116374 A1 | 5/2008 | Ouchi et al. |

FOREIGN PATENT DOCUMENTS

| EP | 0 812 028 A2 | 12/1997 |
| EP | 1 980 817 A2 | 10/2008 |
| WO | WO 2006/105977 A1 | 10/2006 |
| WO | WO 2007/027827 A2 | 3/2007 |
| WO | WO 2007/028472 A1 | 3/2007 |

OTHER PUBLICATIONS

Igor Minin and Oleg Minin, Mar. 31, 2003, LaserFocusWorld, vol. 39—issue-4, p. 1-6.*
David M Pozar et al: "Design of Millimeter Wave Microstrip Reflectarrays" IEEE Transactions on Antennas and Propagation, IEEE Service Center, Piscataway, NJ, US; vol. 45, No. 2; Feb. 1, 1997, XP011002907; ISSN: 0018-926X.
Kaouach H et al: "Design and demonstration of an X-band transmit-array" Antenneas and Propagation, 2009. EUCAP 2009. 3$^{rd}$ European Conference on, IEEE, Piscataway, NJ, USA, Mar. 23, 2009, pp. 1191-1195, XP031470002; ISBN:978-1-4244-4753-4.

* cited by examiner

*Primary Examiner* — Harry Liu
(74) *Attorney, Agent, or Firm* — Muncy, Geissler, Olds & Lowe, PLLC

(57) ABSTRACT

A method for detecting hidden objects by means of electromagnetic millimeter waves is provided, in which a test object is irradiated with millimeter waves and the millimeter waves that are reflected from the test object are evaluated. The millimeter waves are focused on different depth layers of the test object during the irradiation thereof.

17 Claims, 2 Drawing Sheets

METHOD AND DEVICE FOR DETECTING HIDDEN OBJECTS BY MEANS OF ELECTROMAGNETIC MILLIMETER WAVES

This nonprovisional application is a continuation of International Application No. PCT/EP2010/003677, which was filed on Jun. 18, 2010, and which claims priority to German Patent Application No. DE 10 2009 029 913.0, which was filed in Germany on Jun. 19, 2009, and which are both herein incorporated by reference.

BACKGROUND OF THE INVENTION

1. Field of the Invention

The invention relates to a method for detecting hidden objects via electromagnetic millimeter waves, particularly of objects carried by persons.

2. Description of the Background Art

Methods for screening persons, such as flight passengers, for suspicious objects, for example, weapons or explosives, are known in which the persons are scanned by millimeter waves. Methods and devices of this type are described in the International patent applications WO 2006/105977 A1, which corresponds to U.S. Pat. No. 7,583,221, and WO 2007/028472 A1, which corresponds to U.S. Pat. No. 7,609,196.

Depth profiles are to be taken close to a millimeter wave scanner, in the so-called near field, to detect objects carried by persons on their body. With the aid of these depth profiles, the reflecting signals from weakly reflecting objects can be detected, which are normally hidden by the signals of more strongly reflecting objects in other depth layers. Examples of weakly reflecting objects, whose signals are hidden by strongly reflecting objects, are plastic bonded explosives, which have a low millimeter wave reflection, on human skin, which reflects millimeter waves strongly. Likewise, the signals of weakly reflecting plastic mines are hidden, which are located under the highly reflective surface of the earth.

Typically, the depth resolution by means of millimeter waves occurs by the transmission and evaluation of extremely short pulses or by frequency modulation as in FMCW radar. A possible special form of FMCW radar is the so-called stepped-FMCW radar, in which discrete frequencies are used, which are counted back with the aid of Fourier transformation to pulses within the time domain. All of these methods require a very wide bandwidth, if a depth resolution of a few centimeters is required. Thus, a bandwidth of 10 GHz is needed for a depth resolution of 1.5 cm. When the stepped-FMCW radar is used, a relatively small increment of the frequencies is required to avoid phantom targets. Thus, a maximum increment of 100 MHz is permissible for an unambiguous range of 1.5 m.

These requirements are technically very difficult and very expensive to realize. It is difficult, furthermore, to obtain approvals from the authorities for the use of sufficiently wide bandwidths. The effort was therefore made to use modeling methods to obtain the required resolution at a smaller bandwidth. These methods are very costly and cannot be used for real-time systems.

SUMMARY OF THE INVENTION

It is therefore an object of the invention, to provide a method for detecting hidden objects by means of electromagnetic millimeter waves, which enables good depth resolution at a lower technical cost.

This object is attained in an embodiment, in that during the irradiation of an inspection object, the millimeter waves are focused on different depth layers of the inspection object.

The focusing in this case can occur physically or subsequently computationally.

To carry out the method, a device has a transmitting antenna for electromagnetic millimeter waves, a receiving antenna for receiving waves reflected by the inspection object, an evaluation system, and a focusing element, by which the waves transmitted by the transmitting antenna are focused on different depth ranges of the inspection object. The use of a combined transmitting and receiving antenna is also possible.

Another device has one or more transmitting antennas for electromagnetic millimeter waves, one or more receiving antennas for receiving waves reflected by the inspection object, whereby the phases and/or amplitudes of the transmitting and/or receiving antennas are adjustable, an evaluation system, and components for focusing the millimeter waves on a depth layer with the aid of the adjustable phases and amplitudes.

Another device is configured so that a subsequent computational focusing can be carried out. This device has one or more transmitting antennas for electromagnetic millimeter waves, one or more receiving antennas for receiving waves reflected by the inspection object, and an evaluation system, which has components for the subsequent computational focusing of the millimeter waves on a depth layer with the aid of measured amplitudes and/or phases.

In this case, the invention utilizes the properties of focusing, for example, by a focusing element, for example, a lens. The energy is focused on a point and the energy density declines before and after this point. The extent of the decline and thereby the depth resolution depend on the angle of incidence α of the rays on the inspection object.

Objects at a different distance to the antennas can be differentiated in this way based on a sufficient depth resolution. A sufficient depth resolution with monofrequency millimeter-wave scanners is made possible in this way.

A further advantage is that the method can be used for a real-time system.

Preferably, the focusing element is designed likewise as a reflector. This makes it possible to arrange the transmitting antenna between the focusing element and the inspection object with the saving of space. This is possible because shadowing of waves in the middle range has only slight effects on the depth resolution, whereas shadowing of the outer rays is to be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The system described below is intended for the inspection of passengers and pieces of luggage for suspicious objects such as weapons or explosives. The system can be used in other applications in which an inspection object is irradiated with millimeter waves and the millimeter waves reflected by the inspection object are evaluated to detect a hidden item that is not visible.

Figure 1:
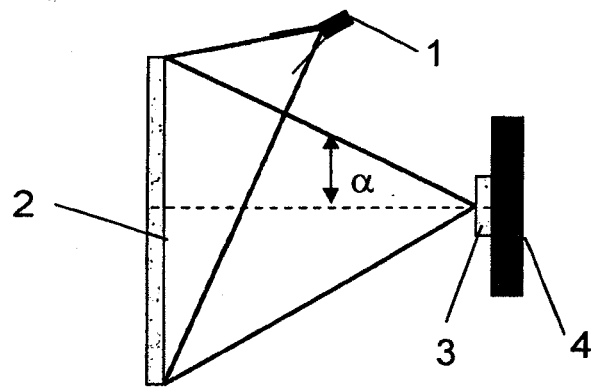
FIG. 1 is a sketch of the basic principle of the invention.

The principle of the method with the basic parts of the device for carrying out the method is shown in FIG. 1. A transmitting antenna 1 for electromagnetic millimeter waves irradiates a focusing element 2, by which the waves transmitted by transmitting antenna 1 are focused on the inspection object. Focusing element 2 is therefore configured so that the focus of the transmitted waves can be adjusted to different depth ranges 3, 4 of the inspection object.

Preferably, focusing element 2, as shown in the exemplary embodiment, is designed likewise as a reflector. Preferably, focusing element 2 has an array of reflector antennas, whose phase shift can be adjusted electronically.

To enable focusing, the transmitting and/or receiving antennas can also be formed so that their phases and/or amplitudes can be adjusted. The device then contains components to focus the millimeter waves on a depth layer by adjustment of the phases and/or amplitudes.

The electromagnetic wave is directed by focusing element 2 to the inspection object. The focusing in this case is adjusted so that the focus is first located in the first depth layer 3. Thus, the maximum energy density is present at the front edge of the first depth layer 3, whereas the energy density at the second depth layer 4 is reduced. For the purpose of receiving the reflected waves, transmitting antenna 1 is configured likewise as a receiving antenna. It is also possible to arrange additional receiving antennas in the array of focusing element 2. Because antenna 1 is a transmitting and receiving antenna, the reflected waves traverse the same path as the waves transmitted by the focusing element, only in the reverse direction. The focus point is adjusted preferably by phase shifting. This is made possible, for example, by the use of patch antennas as reflector antennas in focusing element 2.

During the examination of the two layers 3, 4, the depth of focus is changed so that the focus is moved from layer 3 to layer 4. The reverse direction of focusing is also possible. The two layers 3, 4 of the inspection object can be measured separately in this way and evaluated separately in an evaluation system, which is not shown, to detect hidden objects.

Preferably, focusing element 2 is arranged very close in front of the inspection object. In combination with a suitable shape and suitable dimensions of focusing element 2, the angle of incidence α can be made as large as possible. This leads to an improved depth resolution, because it is proportional to the wavelength and inversely proportional to the square of the numerical aperture NA. The numerical aperture NA is defined as the sinus of the angle α. The depth resolution thus improves quadratically with the sinus of the angle of incidence α. This can be kept as large as possible, when the inspection object is arranged as close as possible to focusing element 2.

Figure 2:
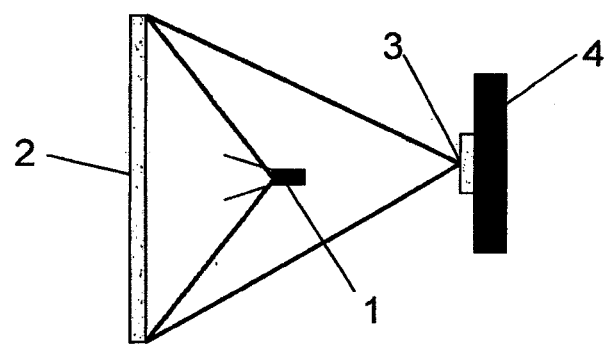
FIGS. 2-4 illustrate various embodiments in a schematic illustration.
Figure 3:
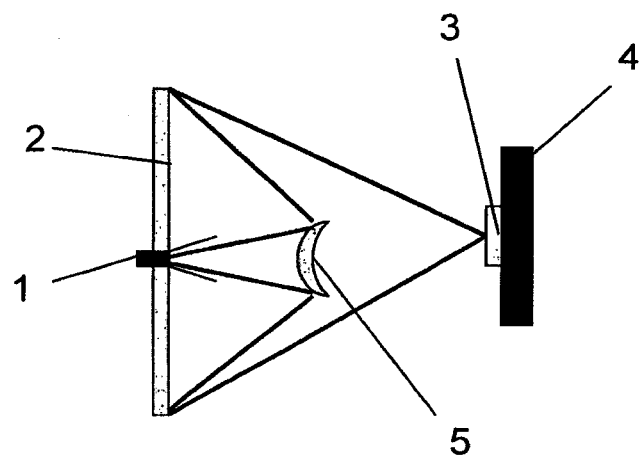
Figure 4:
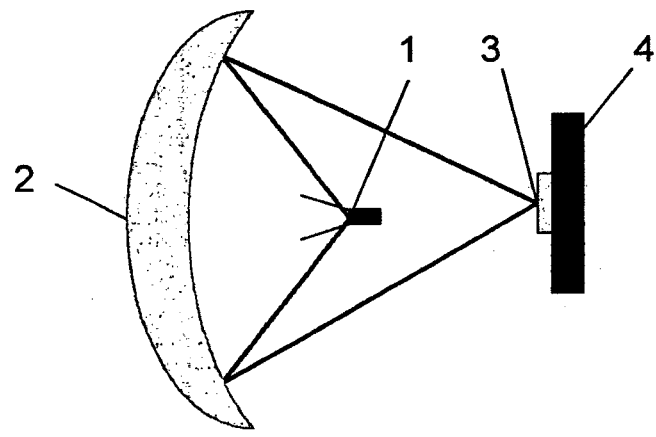

FIGS. 2-4 show various embodiments of the invention. In this case, the transmitting and receiving antenna 1 is arranged in the area between focusing element 2 and the inspection object with depth layers 3, 4. Because in these embodiments transmitting antenna 1 acts at the same time also as the receiving antenna for the reflected waves, a space-saving, symmetric structure of the device is possible. The arrangement of transmitting and receiving antenna 1 between focusing element 2 and the inspection object has only a very minor negative effect on the desired depth resolution, because shadowing in the middle range has only minor effects in this regard. Shadowing of the outer rays should be avoided to avoid detrimental effects on the depth resolution. Therefore, reflecting element 2 extends outwardly as far as possible beyond transmitting and receiving antenna 1. In this way, the numerical aperture is advantageously increased at the same time.

In the embodiment according to FIG. 3, transmitting and receiving antenna 1 is arranged in the array of focusing element 2. An additional reflector 5 directs the rays emitted by antenna 1 to focusing element 2 and the rays reflected by layers 3, 4 of the inspection object again back to receiving antenna 1. In the embodiment according to FIG. 4, focusing element 2 is designed curved like a concave mirror, to focus the millimeter waves in layers 3, 4 of the inspection object.

Monofrequency methods, for example, a phase-array method, a multifrequency method, particularly a stepped-FMCW method, or a pulse radar method is employed as a scanning and evaluation method.

In monofrequency methods, the focusing enables a resolution within the depth of the inspection object. In multifrequency methods, advantageously fewer frequencies are needed for a desired depth resolution at a predefined bandwidth. In pulse radar methods, the sampling rate can be reduced by focusing at the same depth resolution.

Alternatively, the device can also be designed so that the focusing can occur subsequently computationally. The evaluation system then contains components for the subsequent computational focusing of the millimeter waves on a depth layer with the aid of measured amplitudes and/or phases.

In the case of computational focusing, according to an embodiment the evaluation occurs with an SAR method (synthetic aperture). To create this, the transmitting and/or receiving antennas are moved along a known path.

Alternatively, the evaluation can also occur with an inverse SAR method. Then, the inspection object is moved along a known path.

The combination with the prior-art methods described above for depth resolution is also possible. Model-based methods for further improvement of the depth resolution can also be used, and the number of needed frequencies can be considerably limited in a stepped-FMCW method, because the unambiguous range becomes much smaller owing to the focusing. In summary, because of the sufficient depth resolution objects can be differentiated, which are located in different depth layers and thereby have a different distance to the scanning device. Thus, objects hidden by strongly reflecting layers can also be detected.

In the devices for carrying out this method, the transmitting and associated receiving antennas can be positioned in an array so close together that they act approximately as combined, quasi-monostatic transmitting and receiving antennas.

Alternatively, it is possible to arrange the transmitting and associated receiving antennas in an array at such a great distance from one another that they act as bi- or multistatic antennas. Preferably, the distance of a transmitting antenna from the associated receiving antenna is then greater than a wavelength.

All antennas described above are advantageously arranged in an antenna array. If the array is formed as an active antenna array, then the phases and/or amplitudes of the individual elements can be adjusted.

The focusing in a detection device for examining persons was performed electronically above. The use of quasi-optical millimeter wave focusing elements, for example, of quasi-optical lens systems, is also possible, particularly in smaller devices, for example, hand-held or shoe scanners, The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting hidden objects via electromagnetic millimeter waves, the method comprising:
   irradiating an inspection object with millimeter waves;
   evaluating the millimeter waves reflected by the inspection object; and
   focusing, using a focusing element configured as a reflector, during the irradiation of the inspection object, the millimeter waves on different depth layers of the inspection object.

2. A device for carrying out a method according to claim 1, the device comprising:
   one or more transmitting antennas for electromagnetic millimeter waves;
   one or more receiving antennas for receiving waves reflected by the inspection object;
   an evaluation system; and
   the focusing element via which the waves transmitted by the transmitting antenna are focused on different depth layers of the inspection object.

3. The device according to claim 1, wherein the focusing element is a quasi-optical lens.

4. The device according to claim 1, wherein the focusing element is formed as an array of reflector antennas with an adjustable phase shift.

5. The device according to claim 3, wherein the focusing element is designed as an array of transmission antennas with electrically adjustable changing of the phase and/or amplitude.

6. The device according to claim 2, further comprising a transmitting and receiving antenna, arranged between the focusing element and the inspection object, for millimeter waves.

7. A device for carrying out a method according to claim 1, the device comprising:
   one or more transmitting antennas for electromagnetic millimeter waves;
   one or more receiving antennas for receiving waves reflected by the inspection object, wherein the phases and/or amplitudes of the transmitting and/or receiving antennas are adjustable;
   an evaluation system; and
   the focusing element for focusing the millimeter waves on a depth layer with the aid of adjustable phases and amplitudes.

8. A device for carrying out a method according to claim 1, the device comprising:
   one or more transmitting antennas for electromagnetic millimeter waves;
   one or more receiving antennas for receiving waves reflected by the inspection object; and
   an evaluation system, which has a device for the subsequent computational focusing of the millimeter waves on a depth layer with the aid of measured amplitudes and/or phases.

9. The device according to claim 8, wherein one or more of the transmitting and/or receiving antennas are moved along a known path to create a synthetic aperture (SAR).

10. The device according to claim 8, wherein the inspection object is moved along a known path and the evaluation occurs with an inverse SAR method.

11. The device according to claim 8, wherein the transmitting and associated receiving antennas are positioned so close together that they act approximately as combined, quasi-monostatic transmitting and receiving antennas.

12. The device according to claims 8, wherein the transmitting and associated receiving antennas are spaced apart with a distance greater than a wavelength and act as bi- or multistatic antennas.

13. The device according to claim 8, characterized in that the antennas form an antenna array.

14. The method according to claim 1, wherein a depth of focus is changed during examination of the inspection object.

15. A method for detecting hidden objects via electromagnetic millimeter waves, the method comprising:
   irradiating an inspection object with millimeter waves;
   evaluating the millimeter waves reflected by the inspection object; and
   focusing, during the irradiation of the inspection object, the millimeter waves on different depth layers of the inspection object,
   wherein a maximum energy density of the electromagnetic millimeter waves is present at a first depth layer and a reduced energy density is present at a second depth layer.

16. The method according to claim 1, wherein the different depth layers are inspected separately.

17. A device, comprising:
   a transmitting antenna for transmitting electromagnetic millimeter waves to irradiate an object;
   a focusing element configured as a reflector and configured to focus the electromagnetic millimeter waves on different depth layers of the inspection object; and
   an evaluation system configured to evaluate electromagnetic millimeter waves reflected by the object.

* * * * *